Nov. 12, 1946.  E. F. HUDDLE  2,410,943
DOUBLE FEED ENSILAGE BLOWER
Filed Dec. 18, 1944  3 Sheets-Sheet 1
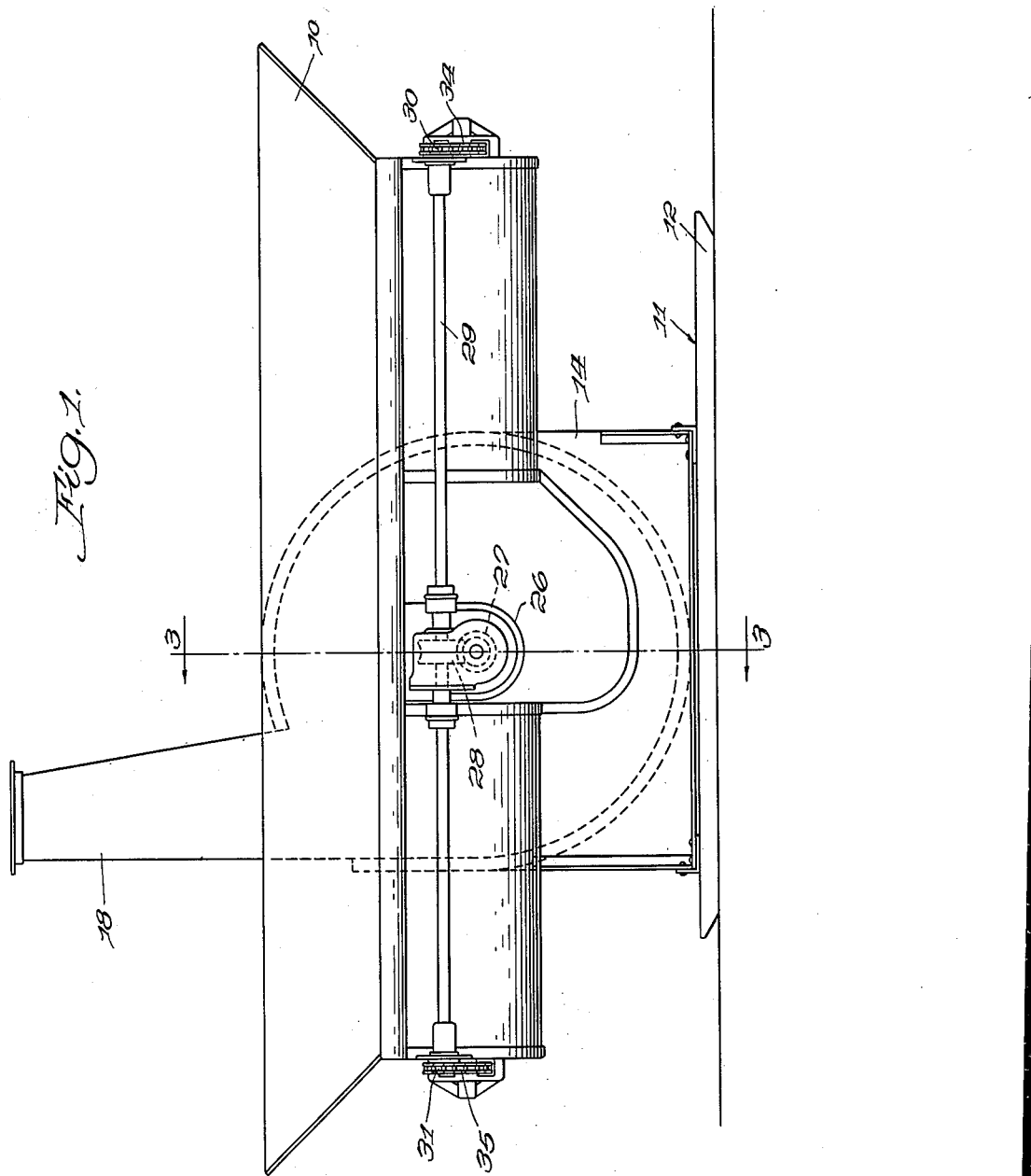

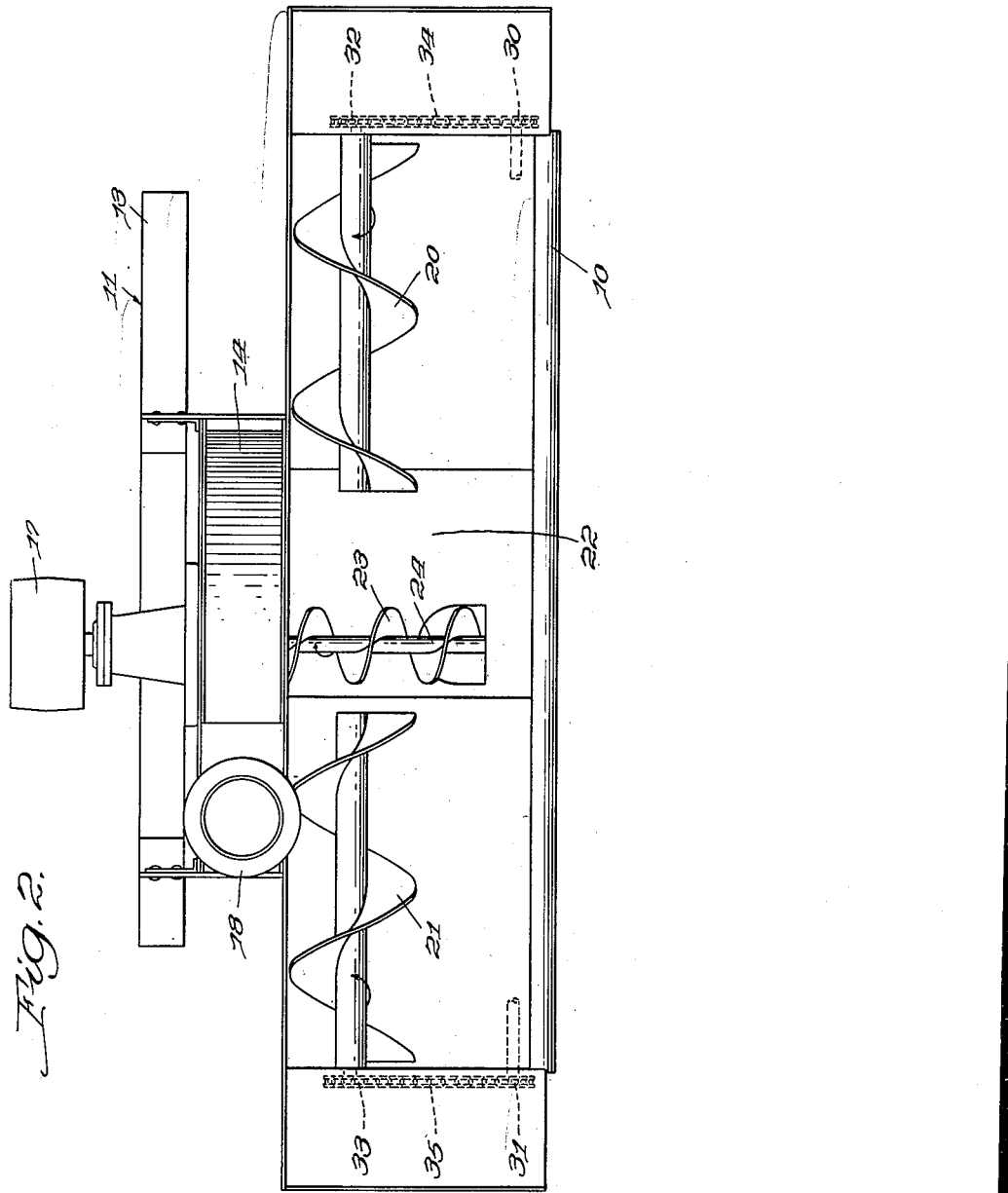

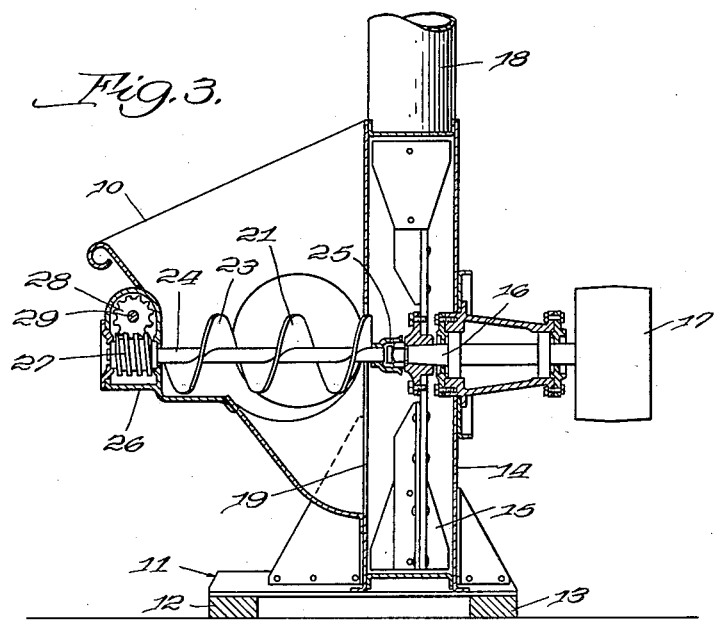
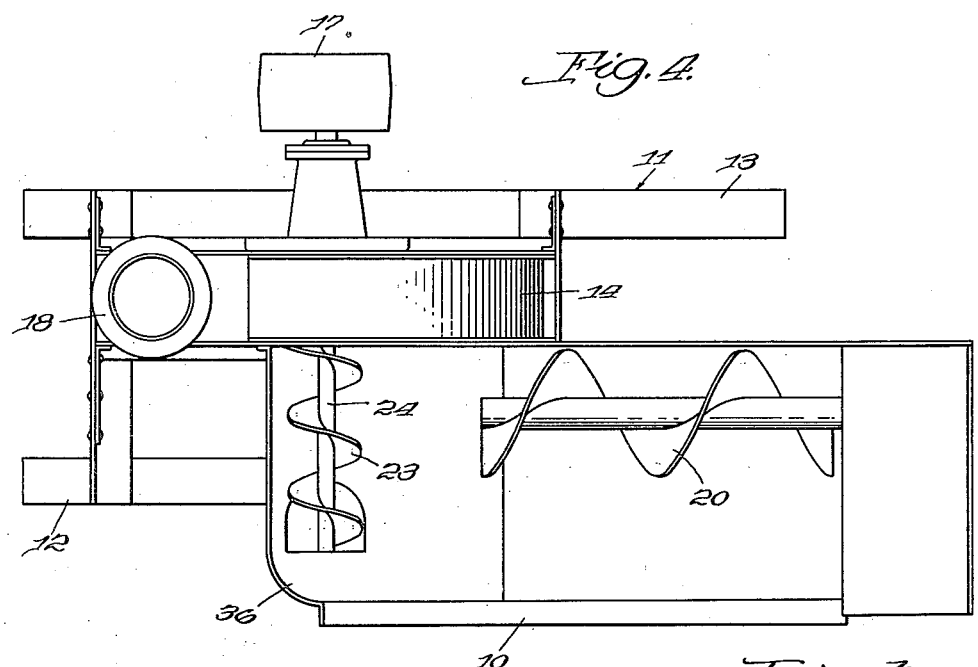

Patented Nov. 12, 1946

2,410,943

UNITED STATES PATENT OFFICE 2,410,943

DOUBLE FEED ENSILAGE BLOWER

Edwin F. Huddle, Elmwood Park, Ill., assignor to International Harvester Company, a corporation of New Jersey Application December 18, 1944, Serial No. 568,613

4 Claims. (Cl. 302—37)

1

This invention relates to a new and improved double feed ensilage blower. The invention has for one of its principal objects the provision of means for receiving a quantity of ensilage and positively feeding it to a blowing mechanism.

An object of this invention is to provide a pair of opposed augers adapted to carry ensilage from an elongated hopper to a central portion thereof which adjoins a blower for elevating ensilage to a storage receptacle.

Another and further important object of this invention is the provision of means for carrying ensilage parallel with the ensilage blower and a further means for feeding ensilage transversely into the blower from the parallel conveying means.

A further important object is to provide an ensilage blower having a sufficiently long hopper to accommodate the dumping of any size wagon or truck and/or to permit several workmen to load the hopper at the same time.

Another and further important object is the provision of means for having a large capacity ensilage blower and having a series of conveying augers positioned so as to carry ensilage from the ends of an elongated hopper to the center thereof and thence to carry ensilage from the center to the blower to insure equal feeding.

Other and further important objects will become apparent from the disclosures in the following specification and accompanying drawings, wherein:

Figure 1 is a front elevation of the ensilage blower of this invention;

Figure 2 is a top plan view of the ensilage blower as shown in Figure 1;

Figure 3 is a sectional view taken on the line 3—3 of Figure 1; and

Figure 4 is a top view of a modified form of ensilage blower.

As shown in the drawings:

The reference numeral 10 indicates generally an elongated hopper for the reception of ensilage either loaded manually or by the dumping of trucks. The hopper is mounted on a supporting stand 11 having a sled-like structure with a pair of shoes or runners 12 and 13. A blower housing 14 in the form of a cylindrical drum is also mounted on this stand 11 in a position parallel to the elongated hopper 10. As best shown in Figure 3, the blower housing 14 encloses a fan 15 fastened to a shaft 16 which is adapted to be rotated by a pulley 17 driven by the power take-off of a tractor, or the device may be driven by a separate electric motor, as desired. The blower housing further includes an upwardly extending outlet conduit 18 which constitutes a tangential upward extension of the circumference of the blower housing 14. A second opening 19 in the

2 blower housing 14 is for the purpose of receiving ensilage from the hopper 10.

Within the hopper 10 a plurality of augers is provided to feed ensilage within the hopper to the inlet opening 19 of the blower housing 14. Two augers, namely, 20 and 21, are positioned lengthwise of the hopper 10 and oppose each other. The auger 20, as viewed in Figure 2, is a left-hand auger and feeds material from the right end of the hopper 10 through an unobstructed or open-end portion of the auger 20 to a central portion 22 of the hopper 10. The auger 21 is a right-hand auger and feeds the ensilage from the left end of the hopper 10 to the central portion 22 thereof. A third auger 23 positioned transversely of and within the hopper 10 and lying in the central portion 22 is adapted to receive ensilage extruded through the open or unjournaled ends of the augers 20 and 21 and carry it at right angles into the fan 15 through the inlet opening 19. The auger 23 is also used for levelling the material that is delivered by augers 20 and 21. By so doing, the opening 19 in the blower housing 14 is never allowed to become clogged. Each of these augers is driven from the fan drive through the shaft 16. An auger 23 having a central shaft 24 is in alignment with the driven shaft 16, and it in turn is driven thereby through a coupling 25. The outer end of the shaft 24 is journaled in a housing 26 forming part of the outer flared portion of the hopper 10. A worm 27 is fixed to the shaft 24 within the hopper 26 and engages a complementary worm gear 28 adapted to drive a cross-shaft 29 which extends the length of the hopper 10 and at the outer ends thereof carries sprockets 30 and 31. As shown in Figure 2, the ends of the augers 20 and 21 are equipped with sprockets 32 and 33 in alignment with the sprockets 30 and 31 respectively. Chains 34 and 35 join the sprockets 30 and 32 and 31 and 33, and hence carry the drive from the pulley 17 through the fan 15 through the auger 23 and from the worm gears 27 and 28 outwardly to the ends of the opposed augers 20 and 21.

Ensilage blowers are commonly used to fill silos or other storage receptacles, and it is customary to haul the ensilage in from the fields with wagons which are dumped on the ground or directly into ensilage blower hoppers. In the past, the common trouble with ensilage blowers has been the failure of the blower due to congestion caused by overloading of the hopper. Different types of conveyors have been employed in the hoppers, but when the hopper became overloaded or even completely covered which should not be sufficient to cause overloading, the conveyors generally of the slatted type failed to operate. This failure of the ensilage blower to operate is primarily not due to failure of the conveyors employed but rather is the failure of the fan to remove ensilage fed by the conveyor. An ensilage blower fan works on a definite principle, and if all the conditions are not present the fan will not operate sufficiently. These conditions required for proper fan operation constitute: (1) a fan rotating at a high velocity; (2) rotation of the fan within a restricted housing; (3) an air inlet concurrent with a feed inlet; and (4) a blower outlet through which ensilage is carried upwardly on a blast of air created by the fan. If the air inlet is cut off from its communication with the atmosphere, the fan will now blow any ensilage. Auger 23 prevents air from being cut off. An example of this occurs when the ordinary ensilage blower has its hopper covered with ensilage and the ensilage is sufficiently high to cover the feed inlet to the blower fan. The conveyors will continue to operate for a short time thus feeding more ensilage to the point of inlet to the fan. However, when the fan fails to get the air necessary to blow the ensilage upwardly through the conduit 18, the ensilage merely congregates within the fan and results in mechanical failure of the fan and subsequently the mechanical failure of the hopper conveyors. The present invention, however, is intended to eliminate congestion around the fan inlet and to provide constant admission of air from the atmosphere to the fan inlet regardless of the amount of ensilage within the hopper 10. It is preferable even in the present ensilage blower to dump the ensilage in the outer end portions of the elongated hopper 10 and thus permit the augers 20 and 21 to feed the ensilage material to the central portion 22 of the hopper and from that point to permit the auger 23 to carry the ensilage into the fan housing 14. This precaution definitely precludes any congestion of the fan 15 as the augers 20 and 21 are designed to carry only that amount of material which will not cause fan congestion. However, if the ensilage should be thrown into the central portion 22 of the hopper 10, the auxiliary auger 23 positioned at right angles to the augers 20 and 21 is adapted to quickly and effectively remove this overloading of material into the fan housing 14 and thus permit air to gain entrance to the fan housing 14. A further advantage in the elongated hopper 10 is to permit the operator of a tractor-pulled wagon considerable leeway in backing the wagon or cart into dumping position adjacent the hopper. Heretofore the hoppers have only been as long as the width of the farm wagon, and if the wagon were not accurately aligned the ensilage could not be satisfactorily dumped into the ensilage blower hopper.

A modified form of the ensilage blower is shown in Figure 4 in which the auger 21 has been completely removed and the hopper shortened to eliminate one end thereof. The same reference numerals are employed on this figure inasmuch as the parts are identical to the device as shown in the first three figures, except for the elimination of the one auger. In Figure 4, the ensilage in the hopper 10 is adapted to be moved toward the end of the hopper 36, which is in alignment with the blower housing 14. The auxiliary auger 23 performs the same function in this modified form of the invention inasmuch as it receives ensilage from the auger 20 and carries it transversely into the opening 19 in the blower housing 14.

Both of these ensilage blowers may be transported on the skids or runners 12 and 13 merely by pulling the device by a tractor or other draft vehicle. For long distance travel, however, the device is preferably carried on a truck or on its own transport wheels.

The structural details of this ensilage blower may be changed without departing from the principles disclosed herein, and I therefore do not propose to limit the patent granted thereon otherwise than as necessitated by the appended claims.

What is claimed is:

1. An ensilage blower comprising a hopper, and a housing enclosing a fan positioned parallel to the length of said hopper and at a point substantially midway of the ends of said hopper, said hopper and housing having a material passage opening therebetween, material conveying augers positioned longitudinally of said hopper and in each end of said hopper for feeding material to the central portion of said hopper, and another auger positioned transversely of and centrally of said first named augers and adapted to receive material from said first named augers and feed it into said fan housing.

2. An ensilage blower comprising an elongated hopper having end portions and a central portion, a housing enclosing a fan positioned parallel to and adjacent the central portion of said elongated hopper, said housing and hopper having a common opening for passage of ensilage from the hopper to the housing, and means for conveying ensilage from the entire length of the elongated hopper to the fan housing, said means including a pair of opposed axially aligned augers lying in the ends of said hopper, and a third auger in the central portion of said hopper and placed transversely of said hopper, whereby material fed from said pair of augers is received by said third auger and fed into said fan housing.

3. An ensilage blower including a housing enclosing a fan, a hopper for receiving ensilage positioned parallel to said fan housing and having a communicating opening therebetween, a conveying auger lying longitudinally of and within the hopper and journaled at one end thereof, the other end of the auger terminating closely adjacent the opening to the fan housing and being unjournaled, a second auger similar to said first named auger in alignment with and opposing said first named auger, whereby each auger feeds material to its open unjournaled end to an open space at the center of said hopper, and a third auger positioned at right angles to said first and second augers at their unjournaled ends, whereby said third auger receives ensilage fed to the central portion of the hopper by said first and second augers and feeds it into said fan housing.

4. In combination, a blower comprising an upright drum, a driven shaft extending at a right angle through the drum and carrying a fan within the drum, an elongated feed hopper disposed alongside the drum, a coaxial shaft extension connected drivingly with the driven shaft and carrying a feed auger to move material in the hopper through an opening formed in the drum into said drum, a second auger having a shaft journaled in one outer end of said elongated feed hopper and having an unsupported end adjacent the first auger, a third auger having a shaft journaled in the other outer end of said elongated feed hopper and having an unsupported end adjacent the first auger, and means driving the latter shafts from the extension shaft through the outer ends thereof.

EDWIN F. HUDDLE.